United States Patent [19]

Goldwasser et al.

[11] Patent Number: 4,783,645

[45] Date of Patent: Nov. 8, 1988

[54] QUASI-STENO KEYBOARD FOR TEXT ENTRY INTO A COMPUTER

[76] Inventors: Eric Goldwasser; Dorothy Goldwasser, both of 993 Barberry Rd., Yorktown Heights, N.Y. 10598

[21] Appl. No.: 719,060

[22] Filed: Apr. 2, 1985

[51] Int. Cl.$^4$ ............................................. H04L 1/00
[52] U.S. Cl. .................... 340/365 R; 340/365 VL; 400/100; 400/482; 400/485; 400/488
[58] Field of Search ........ 340/365 R, 365 C, 365 VL, 340/711, 712; 200/5 A, 5 R, 5 E; 400/100, 472, 473, 479, 482, 485, 488, 490, 496, 484, 486; 364/900

[56] References Cited

U.S. PATENT DOCUMENTS

| | | | |
|---|---|---|---|
| 2,318,519 | 5/1943 | Palanque | 400/482 |
| 3,558,820 | 1/1971 | Baisch et al. | 178/17.5 |
| 3,892,915 | 7/1975 | Budworth et al. | 400/482 |
| 3,929,216 | 12/1975 | Einbinder | 400/488 |
| 3,945,482 | 3/1976 | Einbinder | 400/484 |
| 3,970,185 | 7/1976 | Shelton | 400/482 |
| 4,081,065 | 3/1978 | Zapp | 400/472 |
| 4,307,970 | 12/1981 | McGaughey, Jr. et al. | 400/482 |
| 4,462,085 | 7/1984 | Yamamoto et al. | 364/900 |
| 4,509,138 | 4/1985 | Hayashi et al. | 364/900 |
| 4,527,917 | 7/1985 | Ueno | 400/472 |
| 4,613,247 | 9/1986 | McGunnigle | 400/486 |

FOREIGN PATENT DOCUMENTS

| | | | |
|---|---|---|---|
| 0066991 | 12/1982 | European Pat. Off. | 400/482 |
| 2122947 | 1/1984 | United Kingdom | 400/482 |

*Primary Examiner*—John W. Caldwell, Sr.
*Assistant Examiner*—Mahmoud Fatahi-yar

[57] ABSTRACT

A quasi-steno keyboard permits text entry into a computer either by standard letter-by-letter typing or by stenotyping. The keys of the keyboard are arranged in three parallel rows with the tops of the keys in the first and second rows being substantially coplanar and the tops of at least four keys in the third row being coplanar and lower than those in the first and second rows. The four keys in the third row are laterally centered in the keyboard and are positioned, with respect to the keys of the first and second rows, such that a thumb can rest comfortably on each of these keys when an index or other finger of the same hand rests on a crack between adjacent keys in the first and second rows.

20 Claims, 4 Drawing Sheets

QUASI-STENO KEYBOARD FOR TEXT ENTRY INTO A COMPUTER

REFERENCE TO RELATED PATENT APPLICATION

This application is related to the U.S. Patent Application of Eric and Dorothy Goldwasser, Ser. No. 648,386, filed Sept. 7, 1984 entitled "Stroke Typing System".

BACKGROUND OF THE INVENTION

This invention relates to an improved keyboard for text entry into a computer and to a program for a computer that enables a person to enter words (text) either by standard letter-by-letter keying (typing) or by steno-keystroking (stenotyping).

It is well known that trained court stenographers attain speeds of more than 200 words per minute using a stenotype machine. This machine has recently been modified to store the keystrokes on magnetic tape rather than on paper so that the steno can be translated to English by a suitably programmed computer. A further modification whereby the steno keystrokes are stored directly in the computer memory has permitted the immediate translation of these keystrokes into English words. However, a drawback of this system (often referred to as Computer-Assisted Transcription or CAT) is that it requires a very well trained stenotypist.

SUMMARY OF THE INVENTION

An object of the present invention is to provide a keyboard and a translation program that interprets the keypresses and "keystrokes" (two or more almost simultaneous keypresses) so that a person with little training in stenotyping can increase his or her typing speed by keying some words using steno and some words using standard letter-by-letter typing.

Another object of the invention is to provide a teaching environment in which a person who has typed a word in the standard letter-by-letter mode can be shown a picture on the display screen of how he or she could have used a steno keystroke or strokes to type the word more quickly.

Still another object of the invention is to provide a trained stenotypist with a keyboard and a program that provides the functions of "word processing" and a means of entering text via stenotyping.

These objects, as well as other objects which will become apparent in the discussion that follows, are achieved, according to the present invention, by providing a standard, "QWERTY" keyboard having a multiplicity of keys arranged in at least three parallel rows, wherein the tops of the keys in the first and second rows are substantially coplanar and the tops of at least four keys in a third row are coplanar and are lower than those of the first and second rows.

These slight modifications to a standard typewriter keyboard do not appreciably affect the use of the keyboard for standard typing since the fingers can still touch the keys in the same places as they normally would, although the fingers may come in contact with the keys slightly earlier or later than they otherwise would, due to the height changes.

The modifications of the standard keyboard make it possible to stenotype with this keyboard. In particular, the keys of the first and second rows may be actuated by a typist's fingers, either individually or by pressing plural keys together, and the four keys of the third row may be actuated by the typist's thumbs. Advantageously, the four keys in the third row are laterally centered in the keyboard and are positioned, with respect to the keys of the first and second rows, such that a thumb can rest comfortably on each of these keys when an index or other finger of the same hand rests on a crack between adjacent keys in the first and second rows. In preferred embodiments of the present invention the four keys of the third row are elongated in a direction transverse to the three rows, as compared to the keys of the first and second rows, thereby to accommodate the thumbs of a stenotypist.

When using the keyboard of the present invention it is necessary to provide a computer program that will interpret the keypresses and keystrokes as either standard keypresses whose respective characters should be concatenated to form a word in the standard way, or as steno keystrokes which should be translated to English words (or left as steno coded words). This interpretation is made by taking into account the timing of the keypresses, the presence or absence of a keyed space bar, and the presence or absence of the sequence of keypresses and keystrokes in a stored dictionary of keypresses and keystrokes. Such a computer program is disclosed in our copending U.S. patent application Ser. No. 648,386, referred to above, which is incorporated herein by reference.

The invention will appear more clearly from the following detailed description when taken in conjunction with the accompanying drawings showing, by way of example, preferred embodiments of the inventive concept.

DESCRIPTION OF THE PREFERRED EMBODIMENTS

Figure 1:
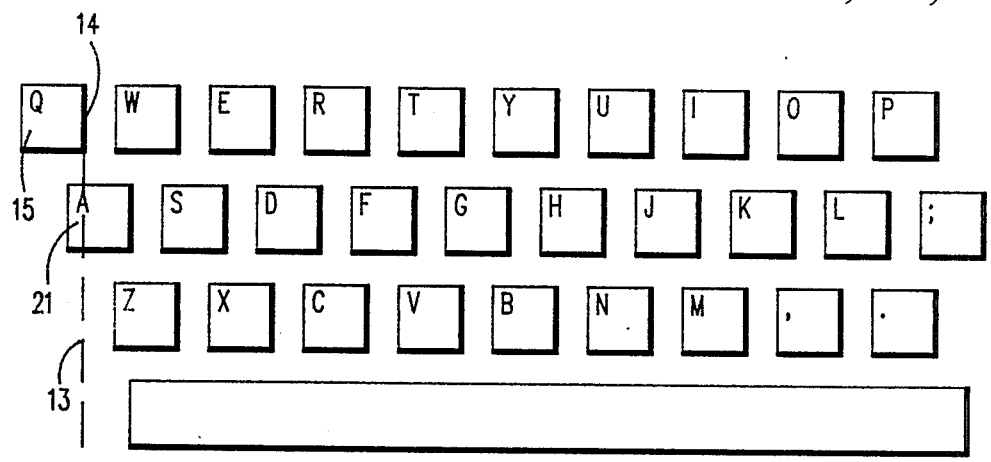
FIG. 1 is a top view of that portion of a standard "QWERTY" keyboard that is relevant to the current invention consisting of the 26 alphabetic keys, an additional key to the right of the "L" key (which is the ";" key on some keyboards), two additional keys to the right of the "M" key ("," and "." on some keyboards) and a space bar key.

The preferred embodiments of the present invention will now be described with reference to FIGS. 1-7 of the drawings. Identical elements in the various figures are designated with the same reference numerals.

Figure 2:
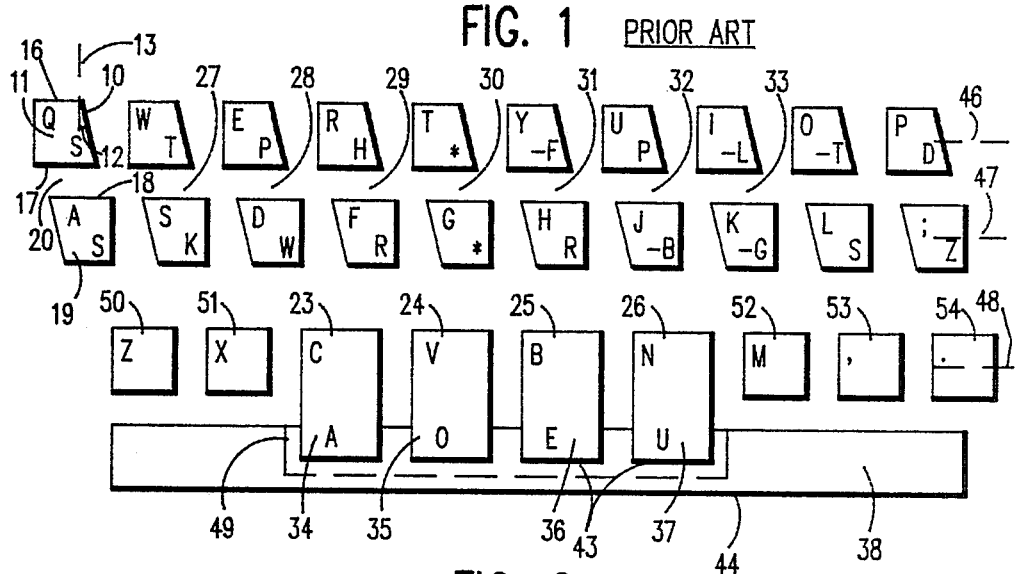
FIG. 2 is a top view of the same portion of the keyboard that is the subject of the current invention.

FIG. 1 shows the keys and the space bar of a standard "QWERTY" keyboard; FIG. 2 shows how this standard keyboard may be modified in accordance with the present invention. As may be seen, each key on the keyboard of FIG. 2 may represent either an individual "QWERTY" character (indicated in the upper left corner of the key) or an additional steno character (indicated in the lower right corner of the key). The interpretation of the signals generated when a key is depressed—as either a "QWERTY" character or a steno character—is made by the computer to which the keyboard is connected.

Referring to both FIGS. 1 and 2, note that one lateral edge 10 of key 11 in the top (first) row of the keyboard of FIG. 2 makes an angle 12 of about 20 degrees with a vertical line 13 that is transverse to the three rows of keys in this keyboard and is parallel to the corresponding edge 14 of the corresponding standard "QWERTY" key 15 (FIG. 1). Note also that the length of key 11 from the top edge 16 to the bottom edge 17 thereof is slightly greater than the length of the corresponding "QWERTY" key 15. The other keys in the first row of the keyboard in FIG. 2 are shaped like key 11. The keys in the second row are similarly shaped except that the left edge instead of the right edge makes an angle of about 20 degrees with the vertical. Also the keys in the second row have been lengthened by moving up the top edge 18 instead of moving down the bottom edge. The non-rectangular shape of the keys 11 and 19 serve to line up these keys so that the crack 20 between them is approximately the same length as the width of the fingertip. Hence the two keys 11 and 19 can be easily depressed with one fingertip by placing the fingertip over the crack 20 between the keys.

Figure 3:
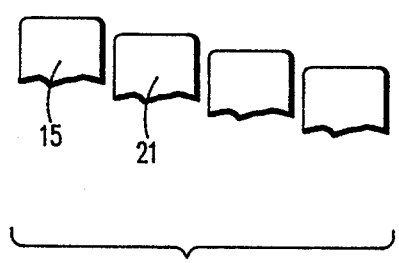
FIG. 3 is a side view of the "QWERTY" keyboard of FIG. 1.
Figure 4:
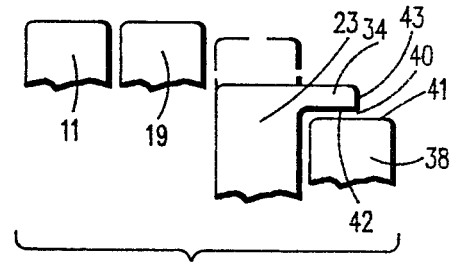
FIG. 4 is a side view of the keyboard of FIG. 2.

Referring to FIGS. 3 and 4 which show the side views of the keyboards of FIGS. 1 and 2, respectively, it is seen that most typewriter keyboards (FIGS. 1 and 3) are constructed so that the top surfaces of keys 15 and 21 of the first and second rows, respectively, differ in height. However, FIG. 4 shows that in the keyboard according to the invention (FIGS. 2 and 4) the top surfaces of keys 11 and 19 in the first and second rows are substantially coplanar, so that when the fingertip is lowered over the crack 20, the two keys 11 and 19 start to move down at almost the same time and the corresponding keypresses are registered in the computer within a very short time of each other. With the keyboard of FIGS. 2 and 4 the top two rows of keys are arranged such that any pair of keys—one in the first row and one in the second row—can be depressed simultaneously by a single fingertip. Referring to FIG. 2 it can be seen that four keys 23, 24, 25 and 26 in the third row are elongated so that when the other eight fingers are resting on the cracks 20, 27, 28, 29, 30, 31, 32 and 33 between the top two rows, the thumbs will comfortably rest on the portions 34, 35, 36 and 37 of keys 23, 24, 25 and 26 that extend over (or into) the space bar 38. Referring to FIG. 4 it is seen that the tops of these same four elongated keys in the third row of keys are lower than the tops of the keys 11 and 19 in the first and second row so that the thumbs will comfortably fit under the index fingers as the index fingers rest on the cracks between the top two rows or on the keys in the top two rows. Hence this keyboard allows several keys to be depressed simultaneously as easily as does a steno keyboard. However, since the keys have not been moved horizontally from the standard position but rather made larger, the fingertips can still go to the positions that they would normally go to during standard letter-by-letter typing.

Referring to FIG. 4 it is seen that the gap 40 between the top 41 of the space bar 38 and the bottom 42 of that portion of keys 23, 24, 25 and 26 that extends over the space bar 38 is sufficiently large so that, when any of the keys 23–26 are depressed, the space bar 38 will not be forced down. As shown in FIG. 2, the keys 23–26 extend only part way over the space bar 38 so the space bar can still be pressed by placing the thumb any place on the space bar that is not obscured by keys 23–26. In particular, the thumb can press the space bar in the area between the front 43 of the keys 23–26 and the front 44 of the space bar 38.

In summary, it may be seen that the keys of the "QWERTY" keyboard in FIG. 2 are arranged in three parallel rows, 46, 47 and 48 with the tops of the keys in the first two rows 46 and 47 being coplanar and the tops of the four keys 23, 24, 25 and 26 in the third row being coplanar and lower than the tops of the keys in the first two rows. The four keys 23–26 in the third row are laterally centered in the keyboard and elongated, in a direction transverse to the three rows, so that the thumbs of a stenotypist can rest comfortably on these keys while the index fingers rest on the cracks between adjacent keys in the first and second rows 46 and 47.

A space bar 38, which may be lower than the four keys 23–26, is provided to permit normal letter-by-letter typing. Since the space bar 38 should be close to the keys 50, 51, 52, 53 and 54 arranged in the third row 48 on opposite sides of the elongated keys 23–26, the space bar may extend beneath the tops of the keys 23–26 or it may have a cutout portion 49 in the region of the keys 23–26.

It will be appreciated that the keyboard of FIGS. 2 and 4 can be used simultaneously for stenotyping and for standard typing in the sense that words can be alternately typed and stenotyped without any delay between the typed and stenotyped words. In the simplest case, a manually actuated switch, such as a foot pedal switch, may be used by the typist to signal the computer when keypresses are to be interrupted as standard letter-by-letter typing (normal typing mode) and when they are to be interpreted as stenotyping (stenotyping mode). For example, whenever a foot pedal is depressed, the computer may interpret keypresses as steno strokes so that the word associated with each stroke is cancatenated with the previously typed words of text. With such a manually actuated system, the computer will unambiguously interpret all the keypresses in the manner intended by the typist.

In a preferred embodiment of the present invention, however, the interpretation of the keypresses as steno or standard typing may also be made automatically by a program residing in the computer memory. This program, which may make the interpretation in dependence upon the timing of successive keypresses, the presence or absence of a keyed space bar and/or the presence or absence of the sequence of keypresses in a stored dictionary of keypresses, will be described below in connection with FIGS. 6 and 7. When a program is used to automatically interpret keypresses as either individual characters (letters) or coded steno words, it may be difficult to distinguish between single keypresses in standard typing which represent individual letters and single keypresses which represent valid steno words. A slight modification of standard steno strokes would eliminate this ambiguity.

Referring to FIG. 2, it may be seen that the following single keypresses are equivalent to, and hence confusable with the indicated single steno keypresses:

| "QWERTY" keypress | Steno keypress | English word corresponding to steno keypress |
|---|---|---|
| a | S | is |

-continued

| "QWERTY" keypress | Steno keypress | English word corresponding to steno keypress |
|---|---|---|
| b | E | he |
| c | A | a or an |
| d | W | with |
| i | -L | will |
| j | -B | be |
| k | -G | go |
| n | U | you |
| o | -T | the |
| r | H | had |
| s | K | can |
| w | T | it |
| y | -F | if |

If one eliminates the combinations of letters which cannot exist in the English language, one is left with only a small set of possible ambiguities between a sequence of typed letters and a corresponding sequence of single keypress steno words. It is believed that the only possibilities for confusion with the letters of a typed word or a portion of a typed word are: (Here "x" and "z" represent arbitrary keypresses)

| Typed | Steno | English | Examples |
|---|---|---|---|
| xinz | X/-L/U/Z | X will you Z | ink = will you go |
| | | | income = will you come |
| xaz | X/S/Z | X is Z | bad = he is with |
| xsz | X/K/Z | X can Z | its = it can |
| xyz | X/-F/Z | X if Z | your = if our |
| | | | every = ever if |

The following slight modifications of the standard steno strokes for these words would eliminate these ambiguities:

| for | instead of | | use | |
|---|---|---|---|---|
| is | a or q | (S) | qa | (S) |
| can | s | (K) | scuj | (KA-N) |
| if | y | (-F) | bny | (I-F) |
| will | i | (-L) | dbni | (WI-L) |

With these modifications, the following algorithm may be used to distinguish typing from steno:
1. If two or more keys are depressed before any of them are released, then interpret the set of keypresses as a steno keystroke.
2. If one key is depressed and released before another key is depressed, wait for the next keypress.
   (a) If the next keypress is another single keypress, then interpret the set of single keypresses up to the next space as standard typing; or
   (b) If it is a steno keystroke, then interpret the previous single keypress as a steno keystroke.

Figure 5:
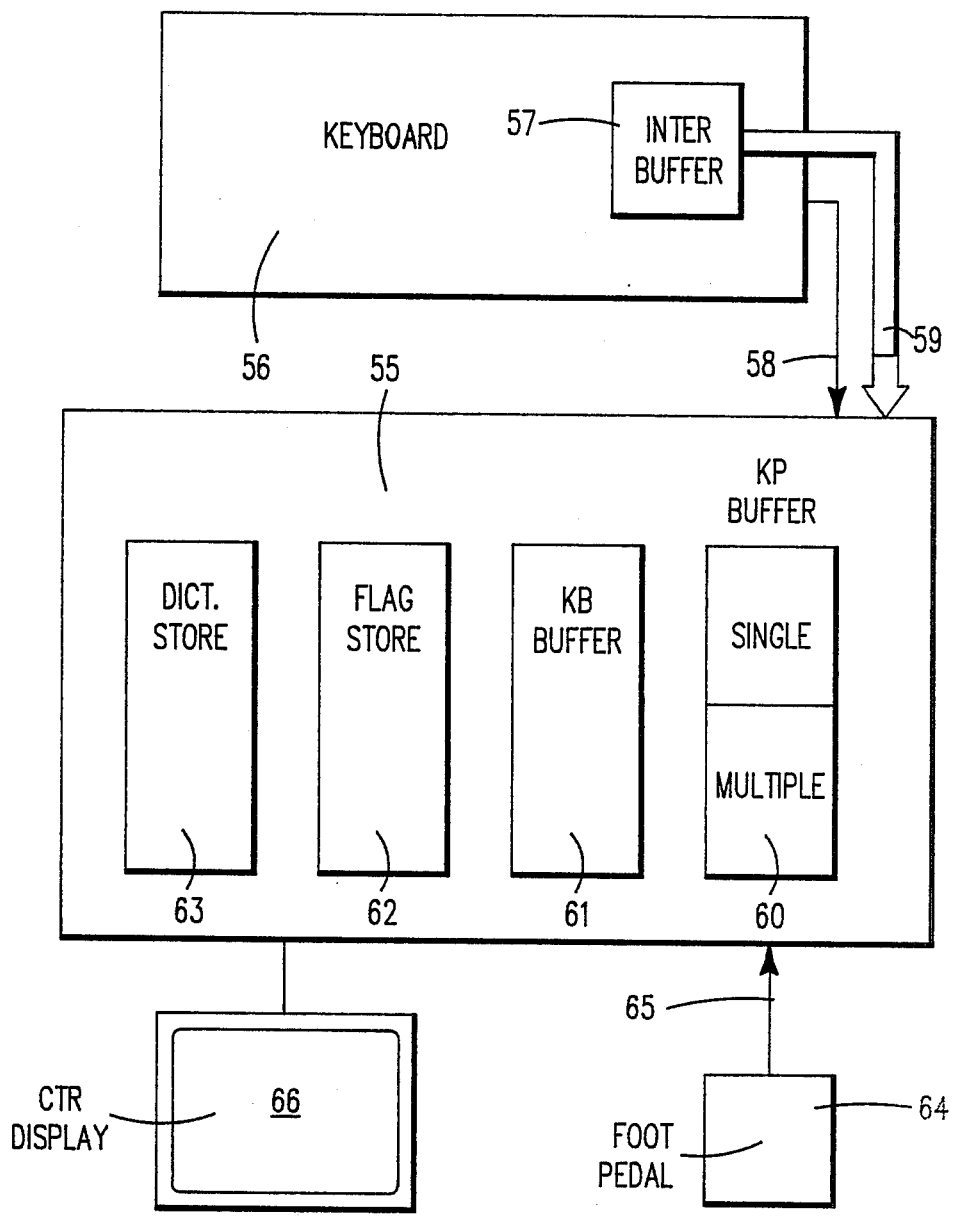
FIG. 5 is a block diagram showing the functional elements of a system employing the keyboard of FIGS. 2 and 4.
Figure 6:
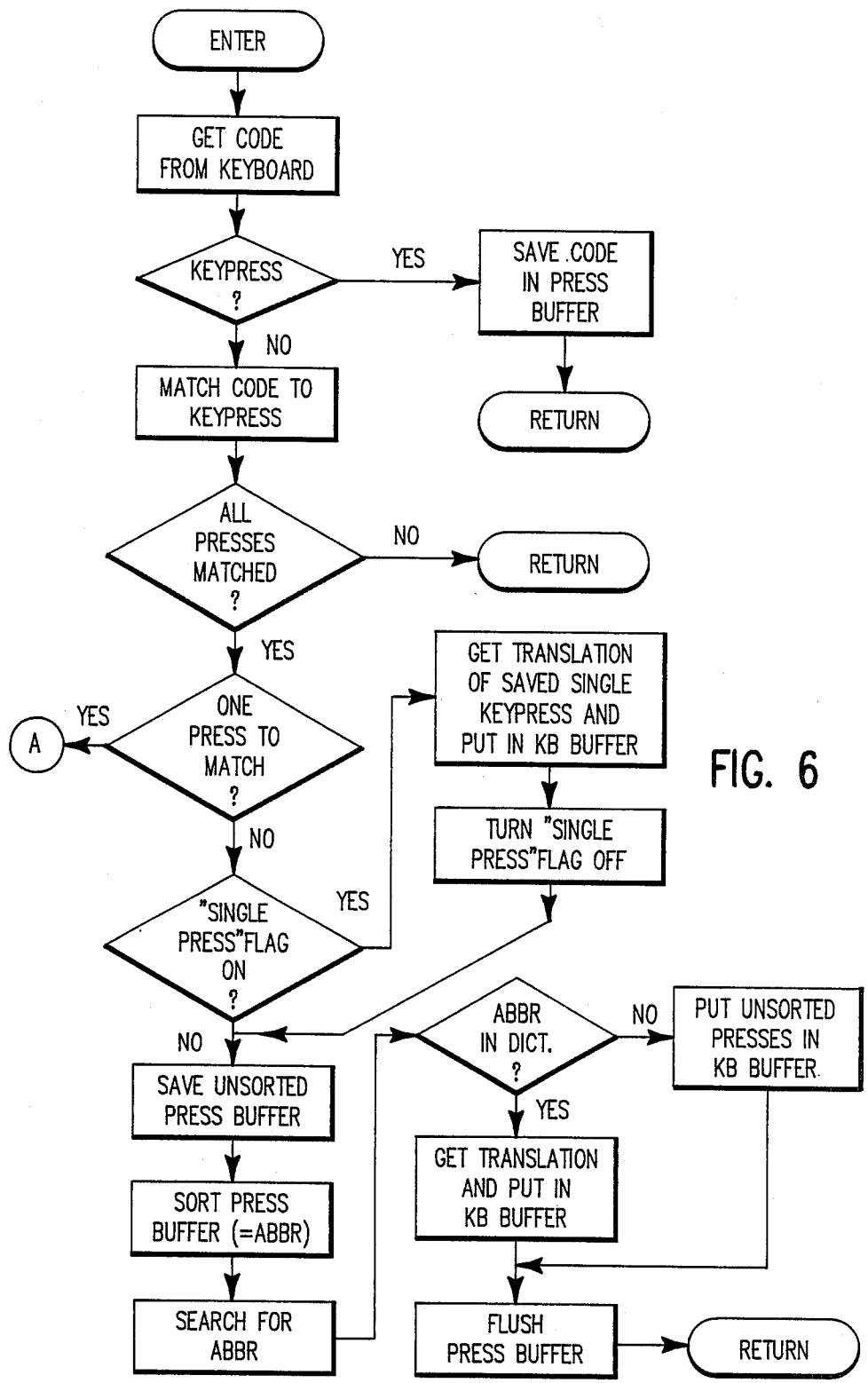
FIGS. 6 and 7 are a flow chart depicting an algorithm for computer software which implements certain functions required for use of the keyboard of FIGS. 2 and 4.
Figure 7:
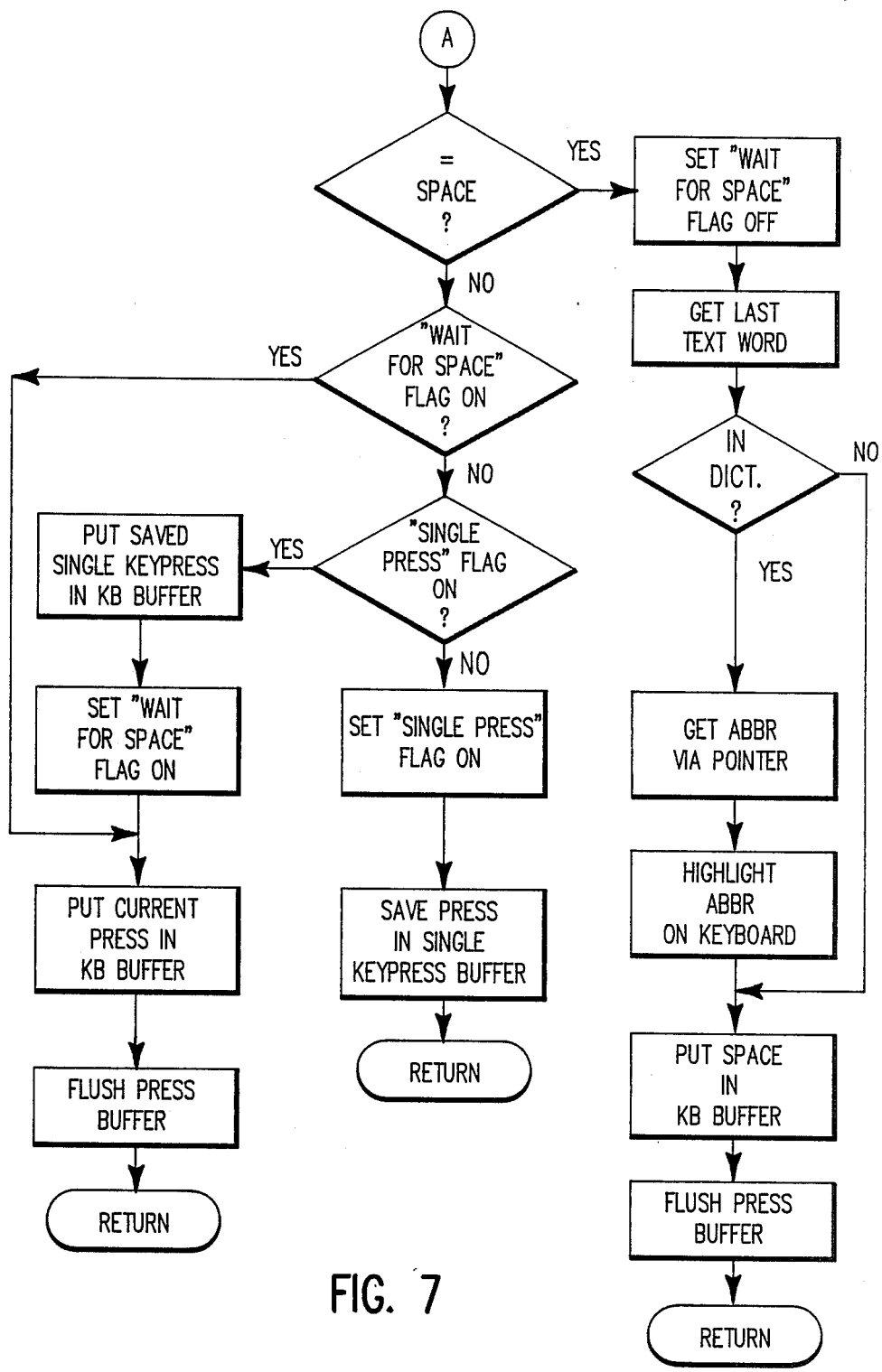

This algorithm may be implemented in a computer system of the type represented in FIG. 5 by the detailed algorithm illustrated by the flow chart in FIGS. 6 and 7. FIG. 5 shows a computer system comprising a central processing and memory unit 55 and a keyboard 56. When a key on the keyboard 56 is depressed, an 8-bit binary number (byte) representing an alphanumeric character associated with that key is placed in an intermediate buffer 57 and a pulse is supplied on an output line 58. During a brief interval following the pulse on line 58, the contents of the intermediate buffer are made available on the 8-lead cable 59.

The pulse 58 is supplied to an interrupt input of the CPU 55. Upon receipt of this interrupt, the computer places the byte appearing on lines 59 in a keypress buffer 60. When the previously depressed key of the keyboard 56 is released, the keyboard supplies a second pulse to the interrupt line 58.

The CPU utilizes four memory storage locations in the algorithm according to the invention. These are the keypress buffer 60 comprised of a single and multiple keypress buffers; a keyboard buffer 61; a flag store 62 and a dictionary store 63. The keyboard buffer 61 is used to hold character codes which will be accessed by an application program such as a word processing program. If desired, the computer system can also be provided with a separate switch 64, such as a foot pedal switch, which supplies an on/off signal to a separate interrupt input via line 65. This switch 64 may be used in place of the algorithm, or as an "override" to the algorithm, to determine whether keypresses are to be interpreted as standard typing or steno keystrokes. The computer system also includes a conventional display device 66, such as a monochrome CRT monitor.

The algorithm illustrated in FIGS. 6 and 7 operates as follows:

The program is entered upon receipt of an interrupt pulse on line 58. If the interrupt pulse was from a keypress, the code on lines 59 is saved in the keypress buffer 60 and the program returns to enter. If the pulse on line 58 represents a key release, rather than a keypress, it is determined which key has been released.

If all of the previously depressed keys have not been released, the program returns to enter. If all of the previously depressed keys have been released (all presses matched) then, as a next step, it is determined whether a single key has been depressed and then released or whether a number of keys have been depressed before all keys have been released.

If a number of keys have been depressed, and then released, the program determines whether a "single press" flag is on. If so, the saved single keypress in the single keypress buffer must represent an individual word of stenotyping. In this case, the translation of the saved single keypress is obtained and this translation is placed in the keyboard buffer. The "single press" flag is then turned off.

The several keypresses must together represent a single steno word. The contents (stored bytes) of the keypress buffer are saved and sorted into a predetermined order (e.g., the numerical order of the bytes). The sorted bytes becomes a variable ABBR and the dictionary of steno words is searched for this variable ABBR. If ABBR is found, the translation (the English word matching the steno abbreviation) is placed in the keyboard buffer. If not, it is assumed that the keypresses represent normal typing and the unsorted keypress codes are placed in the keyboard buffer. Finally, the keypress buffer is reset to zero and the program returns to enter.

If, after all depressed keys have been released, it appears that only one key was previously depressed, the program is directed to the module A shown in FIG. 7. Initially, the program determines whether the last single keypress was a space. If so, the "wait for space" flag is switched off and the dictionary is searched to determine whether it contains the previously typed text word. If it does, this means that the typist could have typed, but did not type this word in steno. In this case, a picture of the keyboard is displayed on the screen and the steno stroke for the previously typed word is imaged on this keyboard.

Thereafter, the space is placed in the keyboard buffer, the keypress buffer is reset to zero and the program returns to the entry point.

If the single matched keypress is not a space, the program determines whether the "wait for space" flag is on. If it is not, the program determines whether the "single press" flag is on. If it is not on, the program turns this flag on, saves the single keypress in the single keypress buffer and returns to the entry point.

If the single keypress flag is on, the single keypress in the single keypress buffer is put in the keyboard buffer and the "wait for space" flag is turned on. Thereafter, the current keypress in the keypress buffer is put in the keyboard buffer and the keypress buffer is reset to zero.

The keyboard of the present invention allows both people well trained in stenotyping and people not well trained in stenotyping to use the keyboard simultaneously as a standard typewriter keyboard and as a steno keyboard. It is expected that people not well trained in stenotyping will be able to use this keyboard and an associated program to create documents by alternately using standard typing for those words that they do not yet know (or have forgotten) how to stenotype, and using stenotyping for those words that they do know how to stenotype. It is further expected that people not well trained in stenotyping will quickly learn to use stenotyping for a sufficient number of words that their typing speed will increase dramatically. The flashing on the display screen of the appropriate steno keystroke whenever a word is not stenotyped should help this learning process. Most important, since the keyboard permits standard typing, useful work can be done during the learning process. Indeed, it is expected that it will not be necessary to have very much of a formal learning period. After a period of time comparable to the usual training period of stenotypists, people using this keyboard can be expected to attain speeds of well over 100 words per minute, even reaching 200 to 300 words per minute which is the speed of a trained stenotypist.

There has thus been shown and described a novel apparatus for entering text into a computer which fulfills all the objects and advantages sought therefor. Many changes, modifications, variations and other uses and applications of the subject invention will, however, become apparent to those skilled in the art after considering this specification and the accompanying drawing which discloses the preferred embodiments thereof. All such changes, modifications, variations and other uses and applications which do not depart from the spirit and scope of the invention are deemed to be covered by the invention which is limited only by the claims which follow.

What is claimed is:

1. In apparatus for entering text into a computer, comprising a standard "QWERTY" keyboard having a plurality of keys arranged in at least three parallel rows, there being at least ten keys in a first row, at least ten keys in a second row and at least seven keys in a third row, said first, second and third rows being oriented successively closer to the position of the keyboard user, the improvement wherein the tops of said keys in said first and second rows are substantially coplanar and the tops of at least four keys in said third row are coplanar and are lower than said tops of the keys in said first and second rows, whereby the configuration of keys corresponds both to a standard "QWERTY" keyboard and to a standard stenotyping keyboard, whereby said keys in said first and second rows may be actuated by fingers, either individually or by pressing plural keys together, and said four keys in said third row may be actuated either by thumbs or fingers.

2. The apparatus recited in claim 1, wherein said four keys in said third row are laterally centered on said keyboard.

3. The apparatus recited in claim 1, wherein said four keys in said third row are positioned, with respect to said keys of said first and second rows, such that a thumb can rest comfortably on each of said four keys when an index finger of the same hand rests on a crack between adjacent keys in said first and second rows.

4. The apparatus recited in claim 3, wherein said four keys in said third row are elongated, in a direction transverse to said three rows, as compared to said keys in said first and second rows, thereby to accommodate the thumbs of a stenotypist.

5. The apparatus recited in claim 4, wherein said keyboard further includes a space bar extending parallel to said three rows in adjacent relationship to said third row.

6. The apparatus recited in claim 5, wherein the top of said space bar is lower than the tops of said four keys.

7. The apparatus recited in claim 5, wherein said third row includes a plurality of keys in addition to said four keys, said plurality of keys being arranged in said third row on opposite sides of said four keys and being of substantially the same size as said keys in said first and second rows.

8. The apparatus recited in claim 7, wherein the tops of said plurality of keys in said third row are substantially coplanar with the tops of said four keys in said third row.

9. The apparatus recited in claim 7, wherein said space bar is arranged closely adjacent and parallel to said plurality of keys in said third row.

10. The appparatus recited in claim 9, wherein the top of said space bar is lower than the tops of said four keys in said third row, and wherein said four keys extend over the top of said space bar.

11. The apparatus recited in claim 9, wherein said space bar is notched in the area of said four keys in said third row, to accommodate said four keys.

12. The apparatus recited in claim 1, wherein the lateral surfaces of said keys in said first row are closely adjacent to facing lateral surfaces of said keys in said second row.

13. The apparatus recited in claim 1, wherein each key in said first row is substantially aligned, in a direction transverse to said three rows, with a corresponding key in said second row.

14. The apparatus recited in claim 1, wherein lateral edges of at least some of said keys in said first and second rows make an angle of approximately 20 degrees with a line transverse to said three rows.

15. The apparatus recited in claim 1, further comprising means for interrupting keypresses of said keyboard as either individual characters or coded words.

16. The apparatus recited in claim 15, wherein said means for interpreting keypresses as either individual characters or coded words makes such interpretation in dependence upon the timing of the successive keypresses.

17. The apparatus recited in claim 15, wherein said means for interpreting keypresses as either individual characters or coded words makes such interpretation in dependence upon the presence or absence of a sequence of keypresses in a stored dictionary of sequences of keypresses.

18. The apparatus recited in claim 15, wherein said means for interpreting keypresses as either individual characters or coded words includes a manually-actuated switch and computer means, responsive to said switch, for selecting the typing mode.

19. The apparatus recited in claim 18, wherein said switch is actuated by a foot pedal.

20. The apparatus recited in claim 15, further comprising display means for imaging a picture of said keyboard and imaging the appropriate steno keystroke on said picture whenever a word is entered by normal letter-by-letter typing.

* * * * *